INVENTOR.
WILLIAM J. HOLM

INVENTOR.
WILLIAM J. HOLM
BY Morse, Altman & Oates
ATTORNEYS

INVENTOR.
WILLIAM J. HOLM
BY
Morse, Altman + Oates

ATTORNEYS

Sept. 10, 1968 W. J. HOLM 3,400,624
APPARATUS FOR EDGE TRIMMING FABRICS
Filed March 8, 1966 5 Sheets-Sheet 5
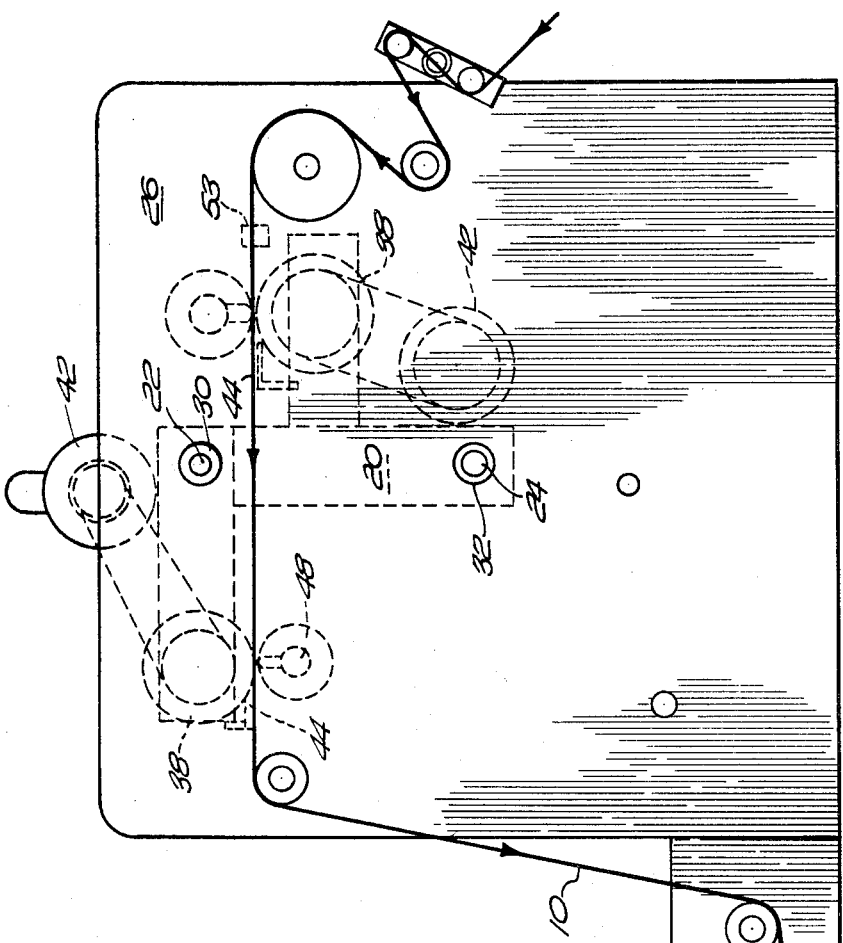
INVENTOR.
WILLIAM J. HOLM
BY
Morse, Altman + Oates
ATTORNEYS

United States Patent Office 3,400,624
Patented Sept. 10, 1968

3,400,624
APPARATUS FOR EDGE TRIMMING FABRICS
William J. Holm, Springfield, Vt., assignor to Parks & Woolson Machine Company, Springfield, Vt., a corporation of Vermont
Filed Mar. 8, 1966, Ser. No. 532,631
7 Claims. (Cl. 83—368)

ABSTRACT OF THE DISCLOSURE

A relatively short rotary shear supported on a movable carriage extends across the edge of a moving web to trim threads hanging from the web edge. The shear rotates about an axis perpendicular to the direction of movement of the web and parallel to the plane of the web and cooperates with a ledger knife fixed to the carriage. The carriage is controlled by means of an automatic web edge detecting unit which causes the carriage with the shearing elements to follow the edge of fabric. Air jets are provided to direct the threads upwardly and into the bite of the shearing elements. A mask is provided whereby the face of the web is protected from the shearing elements.

---

Figure 1:
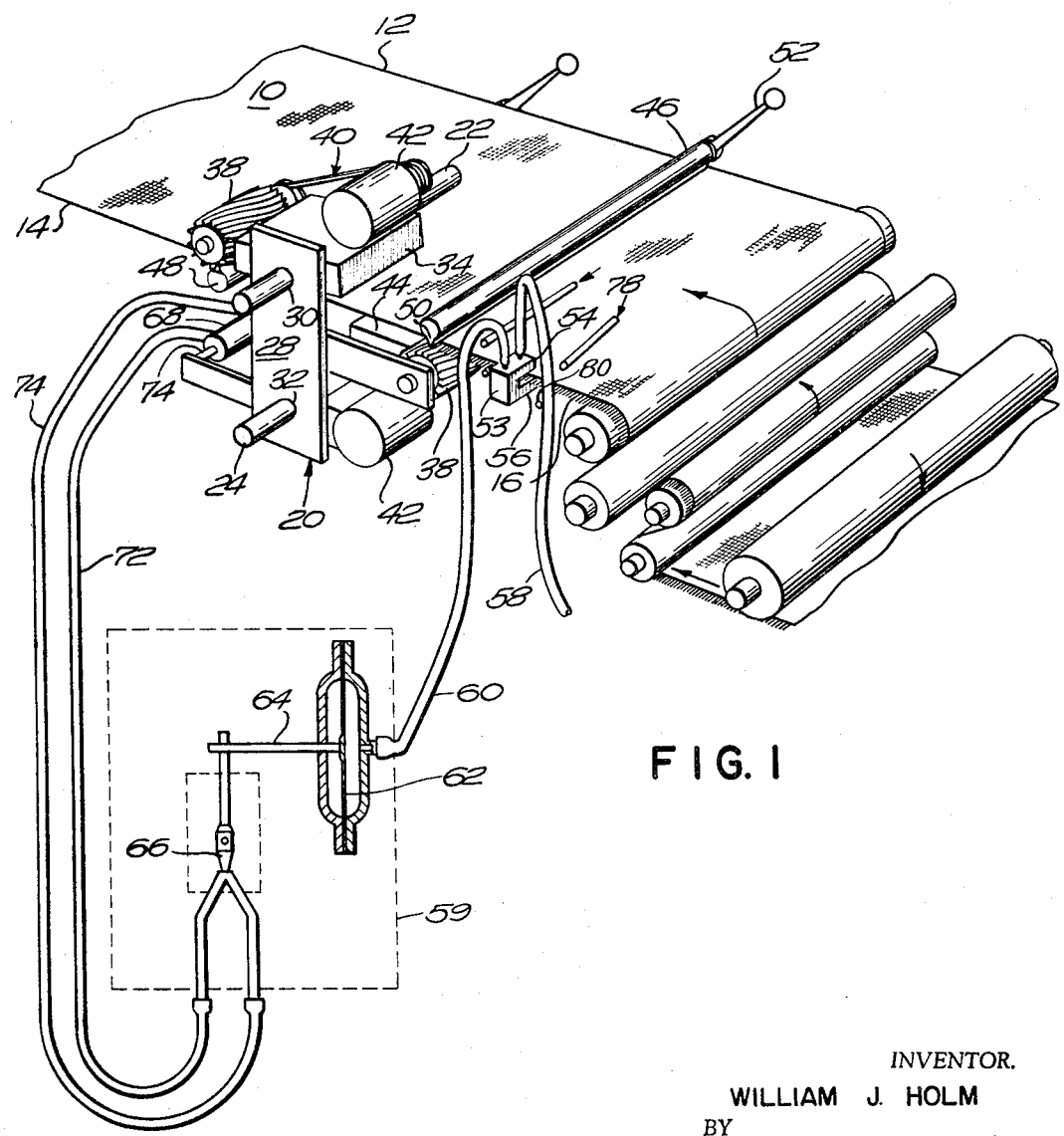

This invention relates generally to textile machinery and more particularly is directed towards a new and improved apparatus for trimming unwanted threads along the edge of a fabric web.

In certain types of fabrics, particularly those woven on a shuttleless loom, short threads on the order of an inch or so are formed along the edge of the fabric as a fringe in the plane of the cloth. Those fabrics woven on the shuttleless loom are characterized by a rather dense formation of threads along one edge only of the woven fabric. These edge threads are usually formed at the end of each filler thread on one side only of the fabric, the opposite side presenting a smooth, straight selvedge.

In most cases the threads formed along the edge are objectionable for a number of reasons and must be removed at some stage during the manufacture of the material. Unless these threads are removed, they tend to damage either the cloth itself or the machinery. It will be understood that these threads, particularly the rather bulky formation found on fabric woven on the shuttleless loom, tend to cluster together to produce an undesirable thickness along the edge of the cloth. This thickness makes it difficult to handle the fabric when passing it through automatic machinery, makes it difficult to wind into a straight cylindrical roll, and also tends to produce undesirable effects during dyeing or printing operations insofar as the loose threads may lie back upon the surface of the cloth and prevent an even dyeing effect along the fabric margins.

Various devices have been developed heretofore for the purpose of trimming the objectionable threads from the fabric edges. However, none of the devices thus far available have been found to be satisfactory for various reasons. For example, existing equipment for trimming these threads have been relatively slow, inefficient and frequently cause damage to the woven part of the fabric. Also, prior devices have not been completely effective in removing all of the loose threads from the selvedge.

Accordingly, it is an object of the invention to provide improvements in apparatus for edge trimming fabrics.

Another object of this invention is to provide a high-speed, efficient apparatus for trimming edge threads from a fabric web without damage to the body of the fabric.

Most particularly, this invention features an apparatus for trimming edge threads, comprising a relatively short rotary shear with associated ledger knife and cloth rest with the shear and knife mounted for movement along a path perpendicular to the length of the running cloth and adjacent to the cloth selvedge. A cloth edge sensing system is operatively connected to move the shearing revolver so as to maintain the shearing elements in cutting contact with the selvedge regardless of lateral shifting of the moving web. This invention also features the use of air nozzles adapted to direct jets of air outwardly of the selvedge in order to maintain the selvedge threads in an outwardly extending position into the path of the cutting elements. A further feature of this invention includes the use of an air draft revolver as the rotary shearing member, the revolver being connected to a vacuum source whereby the threads under the action of the vacuum and the air jets will pull the hanging threads into the bite of the cutting elements.

Figure 6:
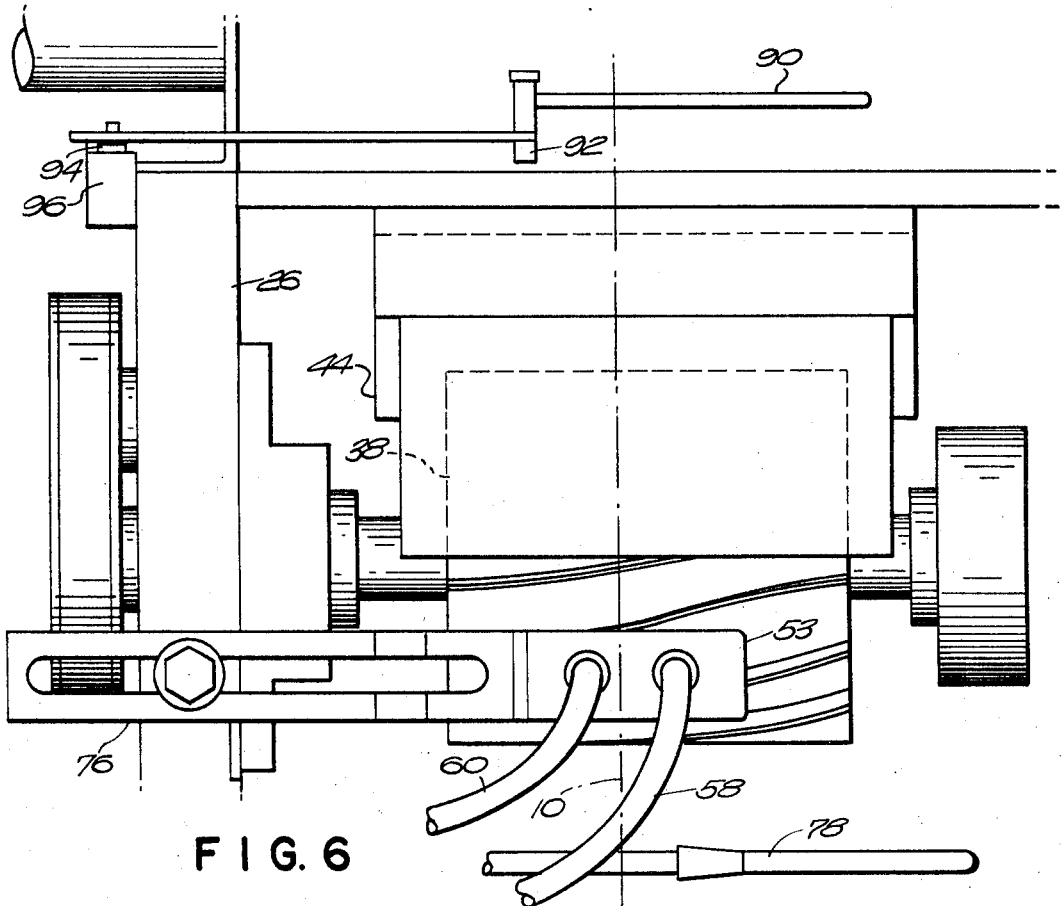
Figure 2:
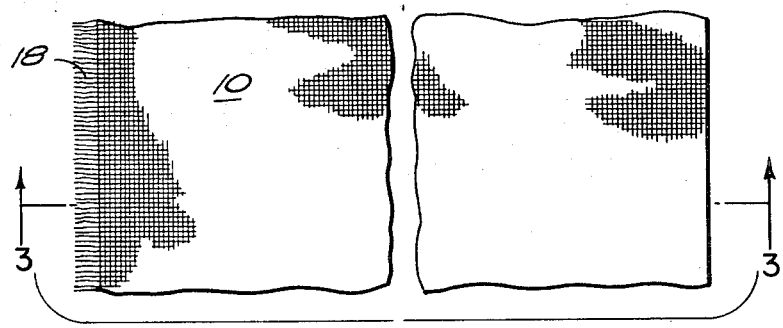
Figure 3:
Figure 4:
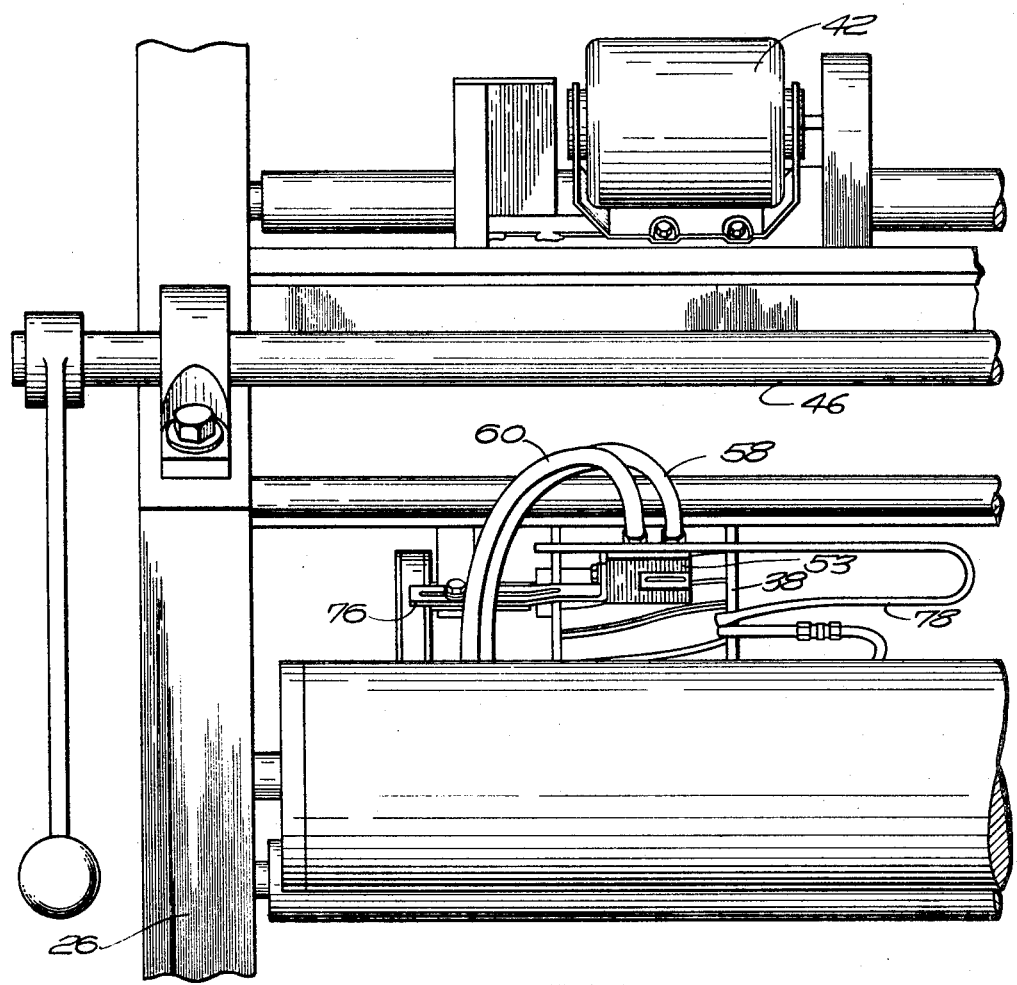
Figure 9:
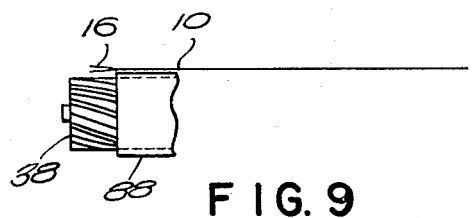
Figure 5:
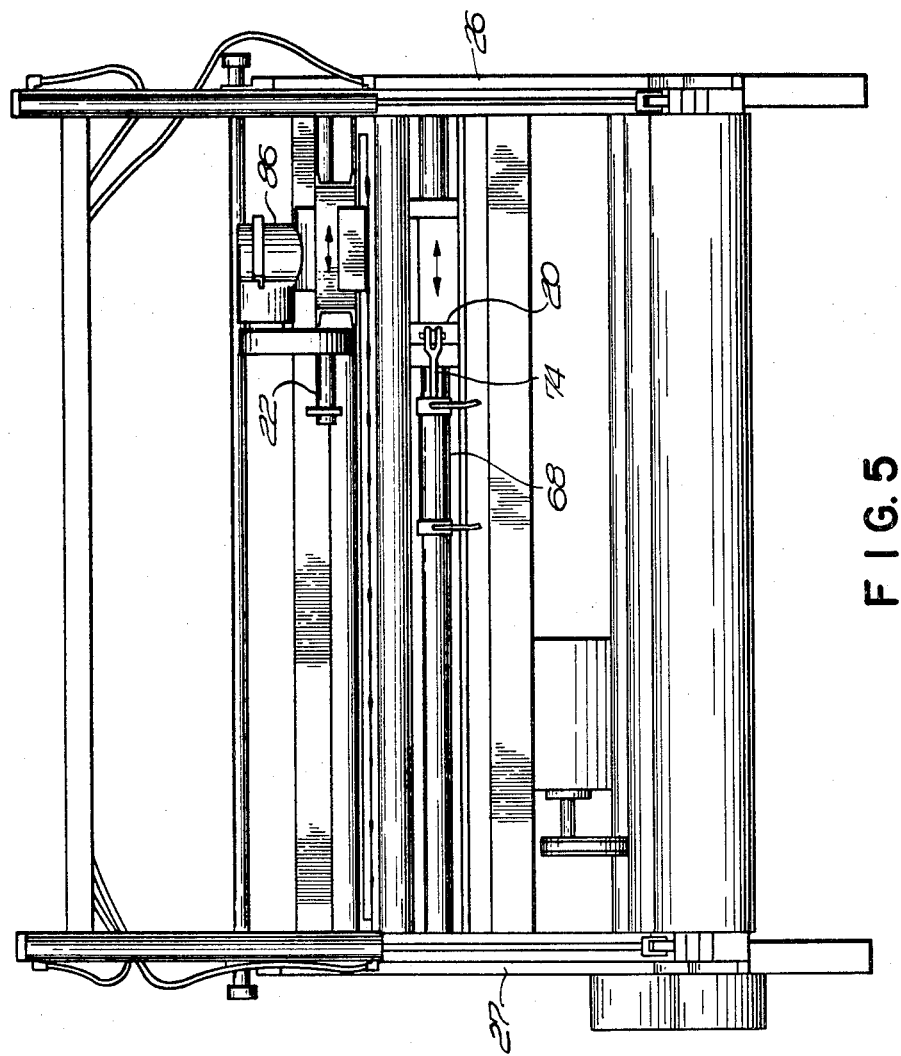

However, these and other features of the invention, along with further objects and advantages thereof, will become more readily apparent from the following detailed description of preferred embodiments of the invention with reference being made to the accompanying drawings, in which:

FIG. 1 is a somewhat schematic view in perspective of an apparatus for trimming edge threads made according to the invention, FIG. 2 is a fragmentary top plan view of a section of cloth such as woven on a shuttleless loom, FIG. 3 is a cross-sectional view taken along the line 3—3 of FIG. 2, FIG. 4 is a front elevation of an edge thread trimming apparatus made according to the invention, FIG. 5 is a rear elevation thereof, FIG. 6 is a fragmentary top plan view of the shearing assembly and guiding mechanism, FIG. 7 is a view in side elevation of the apparatus, FIG. 8 is a somewhat schematic side view of a modification of the invention, and FIG. 9 is a detail front elevation of a further modification of invention.

Referring now to the drawings the reference character 10 generally indicates a fabric web moving from right to left as viewed in FIG. 1. The fabric 10, if woven on a shuttleless loom, is characterized by a substantially straight even selvedge 12 having no loose or free hanging threads while the opposite selvedge 14 is formed with a fringe 16 of bulky threads 18 extending all along the edge and projecting out perhaps ½" to 1" or so. The threads which form the fringe normally are light and fluffy and form into clusters which are substantially thicker than the body of the fabric.

In order to remove the fringe 16 the fabric 10 is fed into the edge trimming apparatus shown in the drawings. This apparatus is generally organized about a carriage 20 mounted for horizontal movement along horizontal supports 22 and 24. The supports 22 and 24 are rigidly fixed to one of two side frames 26 and 27 which form part of the fixed frame work for the apparatus. It will be noted that the upper support 22 extends above the web 10 while the lower support 24 extends below the web for reasons that will presently appear.

The carriage 20 includes a vertical member 28 carrying frictionless bearings 30 and 32 which slideably engage the supports 22 and 24. Brackets 34 and 36 are fixed to the top and bottom respectively of the vertical member 28 and extend over and under the web 10 in sliding engagement with the fixed supports 22 and 24. Each of the brackets carries a rotary shear 38, 6" or so in length, and drivingly connected by a pulley 40 to a motor 42 also carried on the bracket.

Associated with each rotary shear is a ledger knife 44 the edge of which is mounted in close relation to the shearing elements and on the same side of the cloth as the rotary shear. The ledger knife is adjustably mounted to the bracket and is substantially the same length as the rotary shear associated with it. The revolver and its ledger knife are positioned adjacent to the path of travel of the web 10 and oppositely a cloth rest 46 and 48, one each provided for each of the shearing units. The cloth rests are located one above the web and the other below the web and extend the full width of the cloth. Each cloth rest is formed with a nose portion 50 of V cross-section and the ends of each rest are rotatably mounted to the side frames 26 and 27 for movement by a lever 52 whereby the nose portion of the rest may be moved into and out of cloth-engaging position.

The two shearing units, being mounted on a common carriage, are movable in unison horizontally along the supports 22 and 24. The carriage is adapted to move the shearing units in response to changes in the path of the web edge 14. Movement of the carriage with respect to the web edge can be controlled by various types of web edge sensing devices such as those sold by North American Manufacturing Company, for example. In the illustrated embodiment, a web edge sensing head 53 is mounted on the carriage 20 ahead of the first shearing unit and is positioned to span the marginal edge of the fringe side of the web.

The sensing head 53 typically includes a pair of leg portions 54 and 56 extending respectively above and below the selvedge. The head is connected to a source of compressed air through a conduit 58 which directs a jet of air downwardly against the selvedge. A slot opening is formed in the lower leg of the sensing head perpendicular to the length of the cloth and communicating with a control unit 59 through a flexible conduit 60. In the illustrated embodiment the control unit includes a pneumatic diaphragm 62 and it will be understood that the movement of the web edge will cause a change in the pressure to the diaphragm, displacing the diaphragm to or away from a hydraulic relay 64. The relay controls the position of a valve 66 connected to a hydraulic power unit and adapted to direct hydraulic fluid under pressure to either end of hydraulic cylinder 68 through one of two hydraulic pressure lines 70 and 72. As shown in the drawings, the hydraulic cylinder 68 is mounted in fixed position to the frame and is provided with a piston rod 70 which drivingly engages the carriage 20.

It will be understood that with this arrangement any change in the position of the selvedge 14 will actuate the hydraulic cylinder to move the carriage to the right or to the left, as required, in order that the shearing head will follow the web edge and remain in position at all times to trim the fringe along the edge 14.

It will be seen in the FIG. 6 that the sensing head 53 is mounted by a slotted bracket 76 to the carriage whereby the sensing head may be adjusted from time to time with respect to the shearing elements. It will be understood that should the sensing head remain in one position, all of the cutting action would be done by one small section of the ledger knife and shearing blades thus tending to dull the shearing elements in that particular area. By being able to adjust the sensing head with respect to the shearing elements, the carriage may be made to follow the web edge along slightly different positions with respect to the shearing elements. In this fashion the shearing action may be distributed over the full width of the cutting elements by merely moving the sensing head from time to time.

In order that the fringe threads will be in the optimum position for trimming by the shearing elements, air nozzles 78 and 80 are mounted for movement with the carriage 20 above and below the cloth with their discharge orifices directed towards the selvedge from positions inboard of the selvedge. These air nozzles, being thus directed, blow the fringe threads outwardly for presentation to the shearing elements. By directing the nozzle outlet from the cloth surface inside to the outside edge with at least one above and one below the cloth, positioned in close to a parallel plane the effect will keep the selvedge in a steady, flat position without wrinkle and blow the loops or threads into the path of the cutters.

In order to enhance further the combing out of the fringe threads, a driven wire-clothed cylindrical brush 82 may be provided as shown in the modification of FIG. 8. Typically the brush 82 is formed with bristles helically wound about the axis of the brush whereby if the brush is rotated over the edge of the cloth, the threads forming the fringe will be brushed outwardly.

The shape of the sensing head also serves to assist in combing out the fringe threads. It will be understood that the fringed edge of the moving cloth contacts the sensing head and the projecting threads brush along the head. This tends to arrange the normally matted condition of these threads into a combed condition to improve further the condition of the threads for shearing.

If desired, the edge guiding mechanism may be adjusted to cause the carriage to jog continuously back and forth about an inch or so with respect to the cloth while still following the selvedge. This not only distributes the cutting load to prevent dulling the shearing efficiency of the blades, but also helps in combing out the threads for optimum shearing action.

In practice, the rotary shearing elements may be of the air draft construction as disclosed in U.S. Patent No. 3,008,212 or 2,606,355. According to the practice of these patents, the construction of the shearing revolver is such as to create an in-draft which pulls the threads into the bite of the shearing elements for optimum shearing action. In practice a substantial portion of the shearing element is enclosed within a hood 84 (FIG. 8) which is connected by a suitable conduit 86 to a vacuum source. The vacuum draft created by the vacuum source the rotary shearing element and the air jets combine to produce an extremely effective system for bringing all of the objectionable edge threads into the shearing elements.

When trimming the threads along the edge of a relatively tightly woven fabric, generally no shearing action takes place along the surface of the fabric which surface may be riding lightly over the rotary shear. Rather, the only shearing action that takes place is with the fringe threads which are directed into the blades. However, when trimming edge threads on fluffy or loosely woven materials such as terry loop fabrics, for example, a mask 88 (FIG. 9) may be attached to the revolver housing between the fabric and the shearing elements over that portion of the shearing elements located inwardly of the selvedge whereby only a portion of the rotary shearing elements will be exposed and that portion will be located directly opposite the edge of the fabric and outwardly therefrom with none of the blades exposed over the fabric itself.

As shown best in FIG. 6 an automatic cutoff is provided for stopping the feed of the cloth in the event that the shearing unit should accidentally cut through the fabric. This cutoff includes a trip 90 mounted horizontally with respect to the carriage and normally bearing down against the margin of the fabric. The trip is pivotally mounted at 92 and is provided with an actuating finger 94 bearing against a microswitch 96. It will be understood that should the shearing revolver cut through the fabric, the trip 90, which is normally held in a raised position by means of the fabric, will drop through the slit opening made by the accidental cutting of the fabric and will swing it downwardly. This will pivot the finger 94 against the microswitch 96 which is operatively connected to the drive motor and will cause the advance of the fabric to stop whereby any needed adjustments or repairs may be affected.

The apparatus disclosed herewith has been found to be extremely satisfactory in the trimming of threads from the edges of fabrics and is capable of high-speed operation.

Efficient trimming may be carried out at speeds up to 200 yds. per minute as compared with 125 yds. per minute which is the maximum available on the equipment heretofore available. Furthermore, the high speed operation is carried out without damage to the fabric and is completely effective in trimming away all of the edge threads.

While the invention has been described with particular reference to the illustrated embodiments. It will be understood that numerous modifications thereto will appear to those skilled in the art. Accordingly, the above description and accompanying drawings should be taken as illustrative of the invention and not in a limiting sense.

Having thus described the invention what I claim and desire to obtain by Letters Patent of the United States is:

1. Apparatus for trimming threads formed along the edge of a fabric web, comprising:
    (a) a rotary shearing head of a length substantially less than the width of the web,
    (b) said head spanning the edge of said web and being mounted for rotation about an axis perpendicular to the longitudinal movement of said web and parallel to the plane thereof,
    (c) means for advancing said web to carry the edge thereof into tangential contact with said head,
    (d) air jets mounted adjacent the web surface in advance of said head for blowing said threads outwardly of said web and into position for trimming by said head,
    (e) guiding means for maintaining said web edge and said head in predetermined relation, and,
    (f) masking means between said web and said head inboard of said edge to maintain said head out of cutting contact with the surface of said web.

2. Apparatus according to claim 1 including a ledger knife mounted for shearing engagement with said head and a cloth rest extending the full width of said web for directing the web edge into the shearing path of said head and knife.

3. Apparatus for trimming threads formed along the edge of a fabric web, comprising:
    (a) a shearing revolver of a length substantially less than the width of the web,
    (b) said revolver spanning the edge of said web and being mounted for rotation about an axis perpendicular to the longitudinal movement of said web and parallel to the plane thereof,
    (c) means for advancing said web to carry the edge thereof into shearing tangential contact with said revolver, and,
    (d) guiding means for maintaining said web edge and said revolver in predetermined relation.

4. Apparatus according to claim 3 wherein said guiding means includes a carriage supporting said revolver for axial movement parallel to the plane of said web, web position sensing means and carriage actuating means responsive to said sensing means for moving said carriage and revolver to maintain said revolver in shearing position.

5. Apparatus according to claim 3 including compressed air means for blowing said threads outwardly of said web edge.

6. Apparatus according to claim 3 wherein said revolver is of air draft construction and connected to a vacuum source for drawing said threads into said revolver.

7. Apparatus for trimming threads formed along the edge of a fabric web, comprising:
    (a) a shearing revolver of a length substantially less than the width of the web,
    (b) said revolver being mounted for rotation about an axis perpendicular to the longitudinal movement of said web and parallel to the plane thereof,
    (c) masking means disposed between said revolver and said web inboard of said edge to maintain said revolver out of contact with the surface of said web,
    (d) means for advancing said web to carry the edge thereof into shearing contact with said revolver, and,
    (e) guiding means for maintaining said web edge and said revolver in predetermined relation.

References Cited

UNITED STATES PATENTS

| | | | |
|---|---|---|---|
| 2,962,791 | 12/1960 | Remington | 26—10.4 |
| 3,008,212 | 11/1961 | Hadley | 26—15 |
| 3,073,197 | 1/1963 | Gowin | 83—368 |
| 3,077,654 | 2/1963 | Hadley et al. | 26—15 |
| 3,176,567 | 4/1965 | McCormick et al. | 83—368 X |

FOREIGN PATENTS

| | | |
|---|---|---|
| 748,100 | 4/1933 | France. |

WILLIAM S. LAWSON, *Primary Examiner.*